Nov. 11, 1969   DERK TH. A. HUIBERS   3,478,082
PROCESS FOR THE PRODUCTION OF ACRYLONITRILE OR METHACRYLONITRILE
Filed Oct. 29, 1965
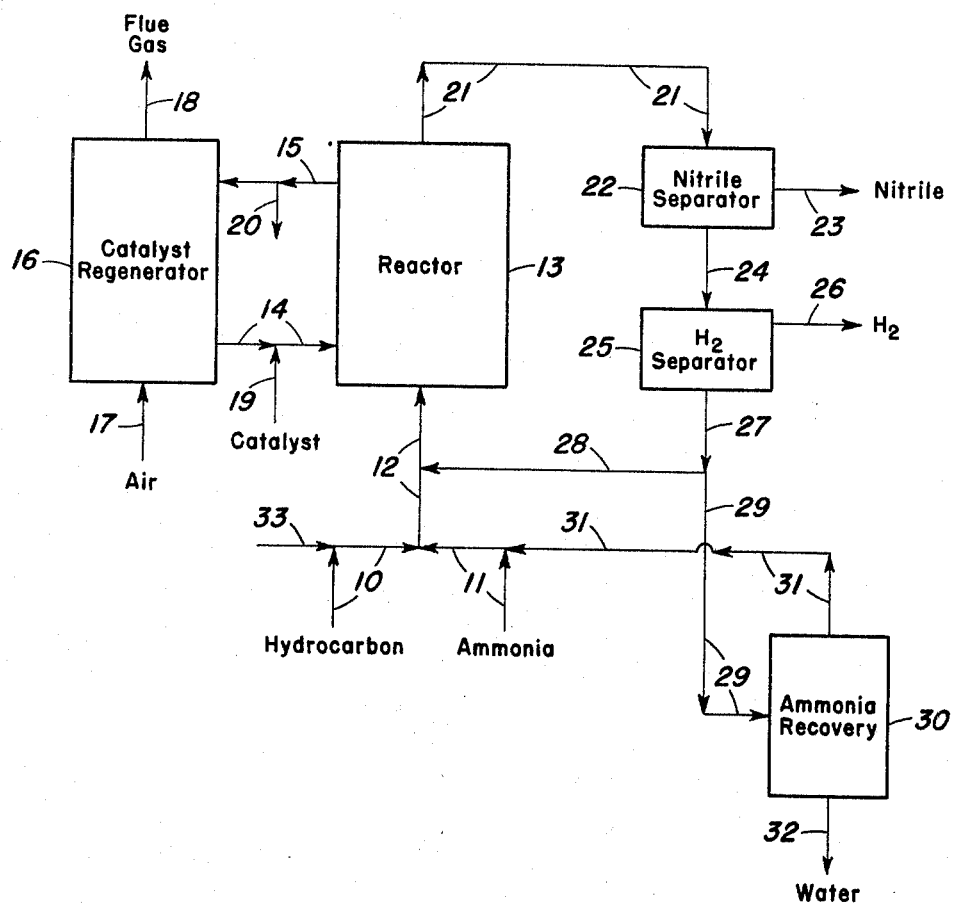
INVENTOR
Derk Th. A. Huibers
BY
ATTORNEY

United States Patent Office 3,478,082
Patented Nov. 11, 1969

3,478,082
PROCESS FOR THE PRODUCTION OF ACRYLO-NITRILE OR METHACRYLONITRILE
Derk Th. A. Huibers, Berkeley Heights, N.J., assignor to The Lummus Company, New York, N.Y., a corporation of Delaware
Filed Oct. 29, 1965, Ser. No. 505,649
Int. Cl. C07c *121/04*
U.S. Cl. 260—465.3     7 Claims

ABSTRACT OF THE DISCLOSURE

A process for producing methacrylonitrile and acrylonitrile by contacting isobutylene or propylene with ammonia in the absence of oxygen and in the presence of an oxide ammoxidation catalyst; such as, a mixture of molybdenum oxide and ferric oxide, molybdenum oxide and bismuth oxide, iron oxide and arsenic oxide, stannic oxide and vanadia, stannic oxide and molybdena, bismuth oxide and phosphomolybdic acid, bismuth oxide and silicomolybic acid, or a vanadia molybdena catalyst at a temperature of 400 to 500° C., with a contact time of 0.01–30 seconds and a catalyst-on-stream time of less than 30 minutes.

---

This invention has to do with a process for forming nitriles. More specifically, the invention relates to a catalytic ammoniation process for converting hydrocarbons to nitriles.

Conversion of hydrocarbons to nitriles by ammoniation has received considerable attention in recent years. For example, propylene has been so converted to acetonitrile in the presence of ammoniation catalysts such as associations of molybdena and vanadia. In such processes, however, acrylonitrile has not been formed from propylene. Correspondingly, xylenes have been converted to tolunitriles but the latter, in turn, have been converted in only minor yields to the corresponding dinitriles such as terephthalonitrile.

In prior processes, temperatures as high as about 700° C. have been required. At such temperatures, there has been a rapid loss in catalyst activity, decrease in conversion selectivity, and substantial coke formation on the catalyst, all cooperating to reduce the yield of desired product.

Another process has also been developed recently for producing nitriles. This is generally referred to as "ammoxidation," wherein oxygen is used as a charge material with hydrocarbon and ammonia. Typical of ammoxidation catalysts are associations of bismuth oxide and molybdena. With oxygen, as in the form of air, oxygenated products are formed, making necessary a purification system to effect separation of desired nitrile and oxygenated contaminants.

It is an object of the present invention, therefore, to provide a selective catalytic process for forming nitriles. Another object is to provide such a process substantially free from coke formation. Still another object is to provide such a process in which temperatures lower than conventional ammoniation temperatures are employed. A further object is to provide an effective process substantially free from formation of undesired oxygenated products. Another object is to provide a continuous process so characterized. A more specific object is to provide a process for converting propylene to acrylonitrile. Other objects will be apparent from the following description.

In accordance with the present invention, there is provided a process for preparing nitriles, comprising: contacting a hydrocarbon with ammonia, in gaseous phase, at a temperature from about 400° C. to about 500° C. in the presence of an oxide catalyst, with a contact time of from about 0.01 second to about 30 seconds and a catalyst-on-stream time of less than about 30 minutes. The hydrocarbon is one which is: stable to thermal decomposition, in the vapor phase at said reaction conditions, and is represented by the general formula

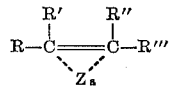

wherein

R, R' and R'' are each H or an alkyl group,
R''' is an alkyl group having up to three carbon atoms,
Z represents an aryl group containing the carbon atoms of the olefinic group $>C=C<$ of the general formula, in which case R and R''' are absent, and $a$ is 1, and
$a$ is 0 or 1.

Hydrocarbons useful as charge materials, individually or in the form of mixtures, are represented by the general formula given above. As indicated, typical olefins include propylene and butylenes. Aromatic hydrocarbons include toluene, xylenes, trimethyl benzenes, ethyl benzene and methyl naphthalenes.

The catalysts employed herein include those known as ammoniation catalysts, that is catalysts used in the conversion of hydrocarbons and ammonia to nitriles without substantial addition of oxygen to the reaction charge. Such catalysts include associations or mixed oxides of molybdenum and/or tungsten, and of vanadium, iron and/or cobalt. Molybdena/vanadia catalysts are effective catalysts.

Ammoxidation catalysts can also be used in the present process, although a free-oxygen-containing gas is not used as a charge material. Typical of such catalysts are the bismuth oxide/molybdena catalysts referred to above.

In addition to such known ammoniation catalysts, I have now found that superior results are realized with the following catalytic materials:

associations of molybdena and ferric oxide or bismuth oxide, as $Fe_2O_3Mo_6O_{18}$,
associations of iron oxides and arsenic oxides,
associations of stannic oxide and vanadia,
$H_4SiMo_{12}O_{40}$,
$Bi_4O_6(H_4SiMo_{12}O_{40})$, and
$Bi_3O_{4.5}(H_3PMo_{12}O_{40})$.

The catalysts can be used per se, or can be supported on or mixed with an inert support such as carborundum, pumice, clay or the like, in which case texture, surface area and pore diameter can be suitably controlled. The inert support can serve to provide mechanical strength and abrasion resistance to the catalyst. The catalyst, with or without support, can be in the form of fine particles such as suitable for use in a so-called "fluidized" reactor bed, pellets, granules, etc.

Essential features in the formation of desired nitriles are contact time and catalyst-on-stream time. Contact time is the period of time during which a unit volume of the reactants is in contact with a unit volume of catalyst. Catalyst-on-stream time is the time during which the catalyst is in use in converting a hydrocarbon and ammonia to the desired nitrile, before it is reactivated or regenerated. It has been found that the contact time should be from about 0.01 second to about 30 seconds, preferably 0.1–10 seconds, with a catalyst-on-stream time of less than about 30 minutes, preferably less than 10 minutes.

In prior processes brief contact times of the order of those used herein have been employed; however, catalysts have been maintained on stream for several hours before reactivation or regeneration. In such processes, propylene is converted to acetonitrile with no formation of acrylonitrile. Additionally, the much longer on-stream times at elevated temperatures have resulted in substantial coke formation on the catalyst. Removal of the coke by burning the same with oxygen has interfered with the heat balance of the process and, in some instances, has resulted in damage to the catalyst.

In the presence of ammonia and hydrocarbon, mixed oxide catalysts of transition metals are reduced. The reduced form is considerably less active than a more oxidized form, which need not necessarily be the highest oxidation level of the oxide catalyst.

In the present process, the relatively short catalyst-on-stream time makes possible maintenance of a high catalytic level, also avoiding any substantial coke deposit on the catalyst. Reactivation of the catalyst with a free-oxygen containing gas such as air or oxygen can be accomplished readily, therefore, in a briefer period of time than in the prior processes alluded to above. In reactivating a used catalyst, it is advantageous to use a sufficient quantity of oxygen to convert the used catalyst to an oxidized state.

In the present process, an excess of ammonia is generally used in relation to the stoichiometrical quantity of hydrocarbon reactant. However, from about 0.5:1 to about 12:1 volumes of ammonia can be used per volume of hydrocarbon, especially a ratio of about 1:1 to 6:1. It is economical, however, not to use a large excess of ammonia, or of a hydrocarbon, particularly in a continuous operation such as described below in order to simplify recycling of a reactant.

The hydrocarbon reactant can be used per se or can be present in admixture with other hydrocarbons inert in the reaction, such as a paraffin or benzene. Preferably, the reaction system is diluted with an inert gas such as nitrogen, steam or water vapor. Thus, it has been found that the use of steam or water vapor has the advantage of retaining the catalyst oxygen for a longer period of time than when the hydrocarbon reactant is converted in the substantial absence of added steam or water vapor. Preferably, from about 3 to about 10, and especially about 5 volumes of steam are used per volume of total reactants, namely, hydrocarbon and ammonia.

The use of a diluent in the process of this invention is advantageous in several respects. With a diluent, the process is operated with a net production of hydrogen and no net heat generation. The diluent also serves to: carry off process heat thereby obviating the need for internal heat transfer surface, and diminish the partial pressures of the reducing compounds charged and formed.

Reaction temperature for forming a nitrile is an important feature. Temperatures below about 400° C. are to be avoided since yields are insufficient. Temperatures above about 500° C. are also to be avoided, since yields are reduced by virtue of decomposition of reactants and products. Preferably, temperatures of the order of 450–460° C. are employed.

Reaction pressures generally range from about 1 to about 10 atmospheres, absolute. Pressures of 1.5–2 atmospheres, absolute, are preferred.

The process can be conducted intermittently or continuously. The latter is particularly advantageous and is illustrated generally in the accompanying drawing which constitutes a schematic flow diagram. In the drawing, hydrocarbon in line 10 and ammonia in line 11 are mixed in line 12 and are charged to reactor 13, wherein they are in reaction in the presence of a catalyst introduced into 13 from line 14. Reactor 13 can comprise a lower preheating zone and an upper reaction zone. Catalyst and reactants flow concurrently up through reactor 13, with catalyst being removed through line 15 to an upper portion of reactivator or regenerator 16. Air or other suitable active oxygen-containing gas is introduced from line 17 to a lower portion of regenerator 16 and is in countercurrent contact with the catalyst for reactivation. Gases formed during deactivation, broadly termed flue gas, are removed through line 18. Reactivated catalyst is recycled from 16 through line 14 to reactor 13. As shown, make-up catalyst can be added to line 14 from line 19, and catalyst fines or catalyst rejected for any reason can be removed through line 20.

Reaction product comprising nitrile product, hydrogen and water, together with unreacted ammonia, are removed from reactor 13 through line 21 to separator 22, from which a nitrile or nitriles are discharged through line 23. Hydrogen, water and ammonia are removed from 22 through line 24 to hydrogen separator 25. Hydrogen is removed from 25 via line 26. Ammonia and water are taken from separator 25 through line 27 and can be passed through line 28 to line 12 for use in reactor 13 or can be passed through line 29 to ammonia recovery unit 30. Ammonia is removed from unit 30 through line 31 and is combined with ammonia charge in line 11. Water is removed from unit 30 through line 32. Diluent can also be charged through line 33.

During reactivation or reoxidation of the catalyst, as in unit 16 of the drawing, the temperature should be controlled lest the catalyst be damaged. The maximum temperature to be used will vary with catalyst employed. Air is preferred as an oxidation medium; however, oxygen and other free oxygen-containing gas can be used satisfactorily.

The following typical, and non-limiting, examples illustrate the invention.

Example 1

A series of runs were made with propylene, ammonia and a variety of catalysts. All runs were carried out with a catalyst charge comprising 10 ml. of catalyst in a process scheme such as shown in the drawing. The charge to the reactor containing the catalyst comprised 15% $C_3H_6$, 10% $NH_3$ and 75% $N_2$ (percent by volume), at 25° C. Contact time was approximately one second. The nitriles were obtained in aqueous solution from the reactor and were analyzed gas chromatographically immediately after termination of a run.

The results set forth in Table I reveal that a typical ammoniation catalyst $V_2O_5/MoO_3$ is effective for the production of acrylonitrile when the catalyst-on-stream time is less than 12 minutes and the contact time is about 1 second. Surprisingly, the ratio of acrylonitrile to acetonitrile product is increased substantially with the catalysts:

$Bi_2O_3/4MoO_3$; $SnO_2/2MoO_3$; $SnO_2/V_2O_5$;

$Bi_4O_6(H_4SiMo_{12}O_{40})$ and $Bi_3O_{4.5}(H_3PMo_{12}O_{40})$; with such time factors.

Example 2

A mixture of p-xylene and ammonia was passed downwardly through a static bed of the molybdena/vanadia catalyst described in Example 6, at 460° C. at a contact time of about 3 seconds. During the first 10 minute period, the product was predominantly terephthalonitrile. Then, a mixture of terephthalonitrile and tolunitrile was formed. Finally, after about one hour, substantially only tolunitrile was formed. When about 30 moles of ammonia are charged per mole of p-xylene, about 8 parts by weight of terephthalonitrile are produced per 1000 parts by weight of catalyst. When, however, part of the ammonia is replaced by nitrogen diluent such that the mole ratio p-xylene/ammonia/$N_2$ is 1/3/30 and the same contact time and the same on-stream time are employed, approximately 20 parts of terephthalonitrile are produced per 1000 parts by weight of catalyst.

Results are shown in Table I, wherein AcN represents acetonitrile, AN represents acrylonitrile and PN represents propionitrile. Time shown in the table is the catalyst-on-stream time.

TABLE I

| Catalyst | Temp., °C. | Time, minutes | Products, relative molar amounts | | |
|---|---|---|---|---|---|
| | | | AcN | AN | PN |
| $V_2O_5/MoO_3$ | 462-465 | 2 | 4.5 | 4.7 | 0.6 |
| | 462-465 | 12 | 4.0 | 1.9 | 0.7 |
| | 462-465 | 22 | 4.5 | 1.2 | 1.3 |
| | 462-465 | 32 | 5.4 | 0.9 | 1.8 |
| | 462-465 | 42 | 6.3 | 0.6 | 2.1 |
| | 462-465 | 52 | 6.2 | 0.5 | 2.1 |
| $3Fe_2O_3/8MoO_3$ | 464-469 | 2 | 10.5 | 11.4 | |
| | 464-469 | 12 | 10.1 | 1.9 | 1.8 |
| | 464-469 | 22 | 15.3 | 1.8 | 2.2 |
| | 464-469 | 32 | 16.8 | 1.4 | 2.9 |
| | 464-469 | 42 | 17.2 | 0.9 | 2.8 |
| $Bi_2O_3/4MoO_3$ | 465 | 2 | 5.1 | 21.4 | 0.4 |
| | 465 | 12 | 4.4 | 5.6 | 0.6 |
| | 465 | 22 | 4.5 | 3.4 | 0.7 |
| | 465 | 32 | 2.6 | 1.8 | 0.6 |
| | 465 | 42 | 1.8 | 0.8 | 0.4 |
| $SnO_2/2MoO_3$ | 467-477 | 2 | 14.2 | 32.5 | |
| | 467-477 | 12 | 1.0 | 0.7 | 0.6 |
| | 467-477 | 22 | 0.4 | 0.2 | 0.5 |
| | 467-477 | 32 | 0.3 | 0.2 | 0.5 |
| | 467-477 | 42 | 0.2 | 0.2 | 0.3 |
| $SnO_2/V_2O_5$ | 461-471 | 2 | 3.5 | 14.3 | |
| | 461-471 | 13 | 0.2 | 1.2 | |
| $Bi_4O_6(H_4SiMo_{12}O_{40})$ | 462 | 2 | 5.6 | 24.5 | |
| | 462 | 12 | 2.1 | 2.8 | |
| | 462 | 22 | 1.3 | 0.4 | 0.3 |
| | 462 | 32 | 0.7 | 0.1 | 0.3 |
| $Bi_3O_{4.5}(H_3PMo_{12}O_{40})$ | 457-465 | 2 | 4.8 | 11.8 | 0.2 |
| | 457-465 | 13 | 4.2 | 0.8 | 1.0 |
| | 457-465 | 23 | 7.0 | | 1.3 |
| | 457-465 | 33 | 9.4 | | 1.9 |
| | 457-465 | 44 | 10.2 | | 1.8 |

Example 3

Example 2 was repeated except that the molar feed ratio p-xylene/ammonia/water was 1/3/42 and the p-xylene contact time was 2.4 seconds. The catalyst-on-stream time was about 30 minutes. Nearly 30 parts by weight of terephthalonitrile were produced per 1000 parts by weight of catalyst before the latter lost its ability to aid in the formation of the dinitrile. The introduction of steam more than tripled the catalyst life, increased reaction rate, and reduced the ammonia recycle by over ten fold.

Example 4

Isobutylene was converted to methacrylonitrile by charging about 15% isobutylene, 10% $NH_3$ and 75% $H_2O$ (by volume), as in Example 1. The temperature was about 460° C. and the contact time approximately 0.9 second. The catalyst was $V_2O_5/MoO_3$. During the first 30 minute catalyst-on-stream period, conversion of isobutylene to methacrylonitrile was about 35%. No methacrylonitrile was formed in each of two successive 30 minute runs.

Example 5

Following the procedure of Example 1, isobutylene was converted to methacrylonitrile. The charge comprised 15% isobutylene, 10% $NH_3$ and 75% $N_2$. The catalyst was an association of $Fe_2O_3/As_2O_3$, containing 42% by weight of arsenic. The temperature was 460–473° C., and the contact time was about one second. Results are tabulated below, wherein relative molar quantities of products are reported.

| | Catalyst-On-Stream Time, Minutes | | |
|---|---|---|---|
| | 2 | 18 | 2[1] |
| Methacrylonitrile | 6.5 | 0.6 | 7.0 |
| Acrylonitrile | 6.8 | 0.4 | 8.7 |
| Acetonitrile | 0.3 | 0.1 | 0.3 |

[1] Following reoxidation of the catalyst with air for 30 minutes at about 460–470° C.

Example 6

The molybdena/vanadia catalyst used in Example 2 was formed by the following procedure.

To a slurry of 187 grams of vanadia in 700 ml. of distilled water, heated on a hot plate to 80° C., was slowly added 379 g. of oxalic acid dihydrate. The solution turned blue and carbon dioxide escaped while vanadia dissolved with formation of vanadyl oxalate:

$$V_2O_5 + 3H_2C_2O_4 \rightarrow 2VOC_2H_4 + 3H_2O + 2CO_2$$

After all the vanadia had gone into solution, 181 g. of ammonium molybdate in 500 ml. of distilled water was added slowly with agitation. A black color developed but no precipitate formed. The pH of the combined solutions was 1.6. It was raised to 6.3 by the gradual addition of concentrated aqueous ammonia (190 ml.). After addition of about 100 ml. of ammonia, the pH had increased to about 4.4, and a black precipitate was formed. When at this value agitation was stopped, the entire mass in the reaction vessel used solidified due to the formation of a metastable micel structure. The mass could be liquefied again upon continuing the agitation. The slurry was poured into baking dishes and left overnight. Evaporation of the aqueous phase was done very slowly; during 5 days, the temperature was brought up gradually to 100° C., and so maintained for 24 hours. Finally, the catalyst was calcined in a muffle furnace. The temperature of the muffle furnace was brought in 3½ hours from 40° C. to 400° C., and kept at 400° C. for one hour. The catalyst mass was then cooled and broken in pieces. The fraction of 6–9 mesh was used.

It will be evident from the foregong that an effective process has been found for the product of nitriles and particularly for the production of acrylonitrile, and methacrylonitrile, for which there are a number of uses. The process is also advantageous for forming terephthalonitrile from p-xylene and phthalonitrile from o-xylene. Acetonitrile formed in the process is a useful solvent.

Many modifications and variations of the invention as set forth above may be made without departing from the spirit and scope thereof.

I claim:

1. In the production of acrylonitrile or methacrylonitrile by contacting ammonia with a hydrocarbon selected from the group consisting of propylene and isobutylene, in the gaseous phase, in the presence of an oxidized form of an oxide catalyst selected from the group consisting of ammoniation and ammoxidation catalysts, the improvement comprising: effecting said contacting of ammonia, hydrocarbon and catalyst in the absence of molecular oxygen at a temperature from about 400° C. to about 500° C., a contact time of from about 0.01 second to about 30 seconds and a catalyst-on-stream time of no longer than about 30 minutes, followed by removal of said catalyst from on-stream, contact of the said removed catalyst with a molecular oxygen-containing gas to regenerate the same and recycling said regenerated catalyst to the on-stream.

2. The process defined by claim 1 wherein the catalyst-on-stream time is between about 0.01 second and about 10 minutes.

3. The process defined by claim 1 wherein the contact time is from about 0.1 second to about 10 seconds.

4. The process defined by claim 1 wherein the contact time is from about 0.1 second to about 10 seconds and the catalyst-on-stream time is between about 0.1 second and about 10 minutes.

5. The process defined by claim 1 wherein the temperature is from about 450° C. to about 460° C.

6. The process defined by claim 1 wherein the hydrocarbon is propylene.

7. The process defined by claim 1 wherein the hydrocarbon is isobutylene.

References Cited

UNITED STATES PATENTS

| | | | |
|---|---|---|---|
| 2,418,562 | 4/1947 | Teter | 260—465.3 |
| 2,450,678 | 10/1948 | Marisic et al. | 260—465 |
| 2,455,995 | 12/1948 | Harris et al. | 260—465.3 |
| 2,463,466 | 3/1949 | Marisic et al. | 260—465 |
| 2,478,464 | 8/1949 | Denton et al. | 260—465 |
| 2,496,660 | 2/1950 | Denton et al. | 260—465 |
| 2,518,295 | 8/1950 | Denton et al. | 260—465 |
| 2,520,181 | 8/1950 | Teter et al. | 260—465.3 |
| 2,535,082 | 12/1950 | Mahan | 260—465.3 |
| 2,540,787 | 2/1951 | Klimitas et al. | 260—465 |
| 2,833,807 | 5/1958 | Farkas et al. | 260—465 |
| 3,152,697 | 7/1964 | Jennings et al. | 260—465.3 |
| 3,153,665 | 10/1964 | Roelen et al. | 260—465.3 |
| 3,200,141 | 8/1965 | Milberger | 260—465.3 |
| 3,232,978 | 2/1966 | Yasuhara et al. | 260—465.3 |
| 3,293,279 | 12/1966 | Young et al. | 260—465.3 |
| 3,308,151 | 3/1967 | Callahan et al. | 260—465.3 |

JOSEPH P. BRUST, Primary Examiner

U.S. Cl. X.R.

260—465